(12) United States Patent
Doroftei

(10) Patent No.: US 6,199,884 B1
(45) Date of Patent: Mar. 13, 2001

(54) HELICAL DRIVE BICYCLE

(75) Inventor: Mighel Doroftei, Calgary (CA)

(73) Assignee: 7444353 Alberta Ltd., Calgary (CA)

( * ) Notice: Subject to any disclaimer, the term of this patent is extended or adjusted under 35 U.S.C. 154(b) by 0 days.

(21) Appl. No.: 08/771,982

(22) Filed: Dec. 23, 1996

(51) Int. Cl.$^7$ .................................................. B62M 1/04
(52) U.S. Cl. ........................ 280/252; 280/253; 280/288.1
(58) Field of Search ........................... 280/252, 253, 280/281.1, 288.1, 236, 237, 258, 259, 260, 261

(56) References Cited

U.S. PATENT DOCUMENTS

| | | | |
|---|---|---|---|
| Re. 33,058 | 9/1989 | Steuer et al. | 74/750 B |
| 51,815 | 1/1866 | Eads | 74/127 |
| 87,630 | 3/1869 | Burns | 200/252 |
| 381,160 | 4/1888 | Moon | 74/127 |
| 395,099 | 12/1888 | Willett | 74/127 |
| 398,899 | 3/1889 | Martignoni | 74/127 |
| 408,745 | 8/1889 | Pool | 74/127 |
| 443,347 | 12/1890 | Allen | 440/21 |
| 450,997 | 4/1891 | Dies . | |
| 465,099 | 12/1891 | Rice, Jr. | 74/127 |
| 465,100 | 12/1891 | Rice, Jr. | 74/127 |
| 549,397 | 11/1895 | Savorgnan . | |
| 552,910 | 1/1896 | Kimball | 74/127 |
| 555,242 | 2/1896 | Hallenbeck . | |
| 578,269 | 3/1897 | Savorgnan . | |
| 579,218 | 3/1897 | Bremer et al. | 74/127 |
| 597,621 | 1/1898 | Russell . | |
| 617,762 | 1/1899 | McCollum | 74/127 |
| 618,330 | 1/1899 | Campbell | 74/127 |
| 622,780 | 4/1899 | Olson . | |
| 641,906 | 1/1900 | Trabue et al. | 43/20 |
| 651,244 | 6/1900 | Forbes | 280/223 |
| 651,316 | 6/1900 | Smith | 74/44 |
| 690,835 | 1/1902 | Clayland | 74/127 |
| 713,633 | 11/1902 | Hall | 242/255 |
| 771,864 | 10/1904 | Eager | 74/127 |
| 829,279 | 8/1906 | Mears | 74/127 |
| 860,953 | 4/1907 | McDowell | 74/127 |
| 882,845 | 3/1908 | Sachs | 475/300 |
| 931,656 | 8/1909 | Sangster | 475/289 |
| 944,064 | 12/1909 | West | 74/127 |
| 994,359 | 6/1911 | Archer | 192/6 R |
| 1,005,690 | 10/1911 | Carlson | 74/57 |
| 1,019,637 | 3/1912 | Hays | 74/127 |
| 1,025,989 | 4/1912 | Master | 440/25 |
| 1,047,509 | 12/1912 | Dziak | 74/127 |
| 1,072,701 | 9/1913 | Collins | 74/127 |
| 1,076,179 | 10/1913 | Whitehead | 74/127 |
| 1,108,392 | 8/1914 | Picken | 440/25 |
| 1,122,085 | 12/1914 | Dudgeon | 74/57 |
| 1,122,376 | 12/1914 | Farmer | 74/57 |

(List continued on next page.)

FOREIGN PATENT DOCUMENTS

| | | | |
|---|---|---|---|
| 236146 | * 5/1945 | (CH) | 280/288.1 |
| 631286 | 12/1927 | (FR) . | |
| 6855 | of 1891 | (GB) . | |
| 20936 | of 1896 | (GB) . | |

Primary Examiner—Brian L. Johnson
Assistant Examiner—Avraham H. Lerner
(74) Attorney, Agent, or Firm—Jeffrey Weiss; Jeffrey D. Moy; Weiss & Moy, P.C.

(57) ABSTRACT

A bicycle with a drive mechanism using reciprocal rectilinear pedal motion to propel a pinion gear against a crown gear face associated with a rear bicycle wheel, rotating the rear wheel. The pinion gear receives motion from a helical member surrounded by a slider. Each pedal is united with the slider which moves linearly along a guide or track, forcing rotation of the helical member as the slider is pushed rearwardly by a pedal. A freewheel or overrunning clutch permits power transfer only when the pedal moves rearwardly and allows freewheeling when the pedal is reset. Reciprocal, linear pedal strokes power the bicycle.

29 Claims, 7 Drawing Sheets

U.S. PATENT DOCUMENTS

| | | | |
|---|---|---|---|
| 1,232,202 | 7/1917 | Brown | 74/57 |
| 1,316,558 | 9/1919 | Cannon | 74/57 |
| 1,389,039 | 8/1921 | Estes | 74/57 |
| 1,413,036 | 4/1922 | Krantz | 74/127 |
| 1,482,689 | 2/1924 | Landes | 74/127 |
| 1,559,578 | 11/1925 | Morgan . | |
| 1,699,687 | 1/1929 | Conterio | 74/127 |
| 1,709,952 | 4/1929 | Ricketts | 43/21 |
| 1,713,219 | 5/1929 | Eisenhauer | 74/57 |
| 1,734,649 | 11/1929 | SHull | 74/57 |
| 1,736,507 | 11/1929 | Peterson | 74/57 |
| 1,736,822 | 11/1929 | Dreisbach | 74/57 |
| 1,776,331 | 9/1930 | Lee | 74/127 |
| 1,780,398 | 11/1930 | Morgan | 74/57 |
| 1,799,458 | 4/1931 | Ekstromer | 74/57 |
| 1,813,468 | 7/1931 | Snyer | 244/64 |
| 1,955,973 | 4/1934 | Norton | 43/20 |
| 2,023,889 | 12/1935 | Kramps | 208/22 |
| 2,028,311 | 1/1936 | Berry | 43/20 |
| 2,041,319 | 5/1936 | Blomgren | 134/58 |
| 2,084,321 | 6/1937 | Corradino et al. | 74/57 |
| 2,137,649 | 11/1938 | Hilliard | 230/173 |
| 2,143,798 | 1/1939 | Ribe | 74/280 |
| 2,153,870 | 4/1939 | Lee | 121/119 |
| 2,193,394 | 3/1940 | Deckert, Jr. | 74/57 |
| 2,245,457 | 6/1941 | Brassell | 74/57 |
| 2,296,164 | 9/1942 | Humphrey | 74/57 |
| 2,301,852 | 11/1942 | Brown | 74/57 |
| 2,321,828 | 6/1943 | Lane | 74/57 |
| 2,389,918 | 11/1945 | MacGill | 230/58 |
| 2,411,438 | 11/1946 | Lane | 103/158 |
| 2,425,813 | 8/1947 | Kuntz | 230/217 |
| 2,578,559 | 12/1951 | Korsgren | 74/60 |
| 2,588,524 | 3/1952 | Herbert | 242/84.4 |
| 2,612,312 | 9/1952 | Clarke | 230/185 |
| 2,895,576 | 7/1959 | Schwerdhofer | 192/6 |
| 2,988,186 | 6/1961 | Dotter | 192/47 |
| 3,102,436 | 9/1963 | Schuller | 74/750 |
| 3,107,541 | 10/1963 | Parsus | 74/57 |
| 3,113,472 | 12/1963 | Schwerdhofer | 74/750 |
| 3,113,652 | 12/1963 | Schwerdhofer | 192/6 |
| 3,114,442 | 12/1963 | Schwerdhofer | 192/6 |
| 3,122,226 | 2/1964 | Schuller et al. | 192/6 |
| 3,166,171 | 1/1965 | Schwerdhofer et al. | 192/64 |
| 3,192,783 | 7/1965 | Cruzan | 74/89 |
| 3,194,089 | 7/1965 | Schwerdhofer | 74/750 |
| 3,299,720 | 1/1967 | Schudalla, Sr. et al. | 74/57 |
| 3,588,144 | 6/1971 | Padial | 280/236 |
| 3,633,938 | 1/1972 | Solomon | 280/255 |
| 3,771,918 | 11/1973 | Winter | 417/266 |
| 3,809,195 | 5/1974 | Schulz et al. | 192/6 A |
| 3,828,627 | 8/1974 | Schwerdhofer | 74/750 B |
| 3,834,733 | 9/1974 | Harris | 280/251 |
| 3,877,725 | 4/1975 | Barroza | 280/242 WC |
| 3,886,807 | 6/1975 | Ellis | 74/521 |
| 3,891,235 | 6/1975 | Shelly | 280/252 |
| 3,908,807 | 9/1975 | Ozaki et al. | 192/6 A |
| 3,916,866 | 11/1975 | Rossi | 123/197 R |
| 3,922,005 | 11/1975 | Bundschuh | 280/237 |
| 3,937,309 | 2/1976 | Schulz et al. | 192/6 A |
| 3,954,282 | 5/1976 | Hege | 280/251 |
| 3,984,129 | 10/1976 | Hege | 280/251 |
| 3,991,736 | 11/1976 | Spellman | 123/197 R |
| 3,994,509 | 11/1976 | Schaeffer | 280/242 WC |
| 3,998,469 | 12/1976 | Ruys | 280/254 |
| 4,004,299 | 1/1977 | Runge | 3/17 |
| 4,019,230 | 4/1977 | Pollard | 280/214 |
| 4,029,334 | 6/1977 | Trammell, Jr. | 280/261 |
| 4,052,912 | 10/1977 | Vukelic | 74/512 |
| 4,081,155 | 3/1978 | Kuan | 244/72 |
| 4,084,836 | 4/1978 | Lohr | 280/254 |
| 4,145,166 | 3/1979 | Justice | 417/519 |
| 4,161,328 | 7/1979 | Efros | 280/290 |
| 4,169,609 | 10/1979 | Zampedro | 280/241 |
| 4,186,934 | 2/1980 | Collings | 280/221 |
| 4,227,712 | 10/1980 | Dick | 280/236 |
| 4,248,448 | * 2/1981 | Dmitrowsky | 280/261 |
| 4,272,096 | 6/1981 | Efros | 280/255 |
| 4,276,003 | 6/1981 | Perkins et al. | 417/415 |
| 4,277,706 | 7/1981 | Isaacson | 310/80 |
| 4,303,255 | * 12/1981 | Thomas | 280/236 |
| 4,400,999 | 8/1983 | Steuer | 74/781 B |
| 4,411,442 | 10/1983 | Rills | 280/221 |
| 4,411,443 | * 10/1983 | Pollard | 280/288.1 |
| 4,421,334 | 12/1983 | Efros | 280/236 |
| 4,462,345 | 7/1984 | Routery | 123/58 C |
| 4,473,236 | 9/1984 | Stroud | 280/258 |
| 4,493,614 | 1/1985 | Chu et al. | 417/22 |
| 4,536,130 | 8/1985 | Orlando et al. | 417/63 |
| 4,560,181 | 12/1985 | Herron | 280/242 WC |
| 4,597,302 | 7/1986 | McLendon, Jr. | 74/57 |
| 4,625,580 | 12/1986 | Burt | 74/594.4 |
| 4,630,839 | 12/1986 | Seol | 280/255 |
| 4,657,273 | 4/1987 | Slater | 280/271 |
| 4,702,486 | 10/1987 | Tsuchie | 280/255 |
| 4,758,013 | 7/1988 | Agrillo | 280/242 WC |
| 4,770,433 | 9/1988 | Hartmann | 280/260 |
| 4,796,430 | 1/1989 | Malaker et al. | 62/6 |
| 4,828,284 | 5/1989 | Sandgren . | |
| 4,829,841 | 5/1989 | Ogawa | 74/127 |
| 4,861,055 | 8/1989 | Jones | 280/234 |
| 4,942,936 | 7/1990 | Gardner, Jr. | 180/207 |
| 4,958,830 | 9/1990 | Huggins et al. | 272/69 |
| 5,007,631 | 4/1991 | Wang | 272/70 |
| 5,156,412 | 10/1992 | Meguerditchian | 280/241 |
| 5,167,168 | 12/1992 | Beumer | 74/810.1 |
| 5,172,926 | 12/1992 | Mannino . | |
| 5,180,351 | 1/1993 | Ehrenfried | 482/52 |
| 5,182,962 | 2/1993 | Leiter | 74/473 |
| 5,209,190 | 5/1993 | Paul | 123/43 AA |
| 5,236,211 | 8/1993 | Meguerditchian | 280/241 |
| 5,242,181 | 9/1993 | Fales et al. | 280/251 |
| 5,280,936 | 1/1994 | Schmidlin | 280/234 |
| 5,290,054 | 3/1994 | Po | 280/288.1 |
| 5,295,927 | 3/1994 | Easley et al. | 482/52 |
| 5,299,819 | 4/1994 | Leu . | |
| 5,310,202 | 5/1994 | Goodspeed . | |
| 5,335,927 | 8/1994 | Islas . | |
| 5,403,027 | * 4/1995 | Hwang | 280/261 |
| 5,443,279 | 8/1995 | Nurnberger | 280/236 |
| 5,451,070 | 9/1995 | Lindsay et al. . | |
| 5,452,647 | 9/1995 | Murakami et al. | 92/71 |
| 5,472,320 | 12/1995 | Weisbrodt | 417/326 |
| 5,486,016 | 1/1996 | Godin et al. | 280/250.1 |
| 5,496,051 | * 3/1996 | Farmos | 280/252 |
| 5,514,053 | 5/1996 | Hawkins et al. | 482/63 |
| 5,540,456 | 7/1996 | Meier-Burkamp et al. | 280/236 |
| 5,542,335 | 8/1996 | Goodyear | 91/61 |
| 5,542,340 | 8/1996 | Murakami et al. | 92/71 |
| 5,785,337 | * 7/1998 | Ming | 280/255 |

* cited by examiner

HELICAL DRIVE BICYCLE

TECHNICAL FIELD

The invention relates to bicycles, and more particularly to a bicycle frame and drive construction.

BACKGROUND ART

The bicycle is a marvelous invention, supporting loads many times its own weight over all types of surfaces and terrain, yet powered by man, mostly without undue stress to the human body. According to Encyclopaedia Britannica, the earliest bicycle was invented in Scotland, about 1839, by Kirkpatrick MacMillan and improved a few years later by Gavin Dalzell. The modern bicycle, known also as the "safety bicycle", was invented by H. J. Lawson in 1876 and was first marketed in a useful form in 1885. One of the features of the modern bicycle is a chain or indirect drive, transferring power from pedals driving a crank below and forward of the saddle to a rear gear and axle associated with the rear wheel. Thus, bicycle design has basically remained the same for over 100 years, with improvements in materials, gearing, brakes and manufacturing methods. On the other hand, earlier bicycles, prior to the modern bicycle, frequently employed direct drive, i.e. direct transfer of power to a wheel without use of a chain or belt.

Both early and modern bicycles have relatively high centers of gravity because a rider is seated generally upright. The invention of the recumbent cycle lowers the center of gravity, but this is an exception. See, for example, U.S. Pat. No. 5,280,936 to D. Schmidlin or U.S. Pat. No. 5,242,181 to H. Fales et al.

In U.S. Pat. No. 5,156,412, O. Meguerditchian teaches a bidirectional rectilinear motion system for pedals of a bicycle whereby linear motion is converted to rotary motion for driving a chain and a rear wheel. The linear motion saves energy which is otherwise lost in providing circular motion to a crank. In U.S. Pat. No. 555,242 to J. Hannenbeck, a cycle is shown having pinions on the rear axle which are driven by reciprocating pedals, connected to jointed arms having toothed sectors at the rearward ends for traveling around the pinions. U.S. Pat. No. 3,998,469 to F. Ruiz teaches a similar drive mechanism.

Notwithstanding advances of the prior art, there is a need for a more efficient bicycle which maximizes human power, while minimizing energy losses. An object of the invention was to provide such a bicycle.

SUMMARY OF THE INVENTION

The above object has been achieved with a bicycle which features a direct drive mechanism realizing power from reciprocating rectilinear motion of the legs. The drive arrangement provides for rearward extension of the legs as the pedals are moved backwards, allowing for maximum pushing force similar to weightlifting, and at the same time matching human ergonomics. Pedals are guided along a track in a power assembly. An elongated bar is twisted along its axis by the pedals and is mounted for axial rotation. One end of the bar carries a pinion gear and is mounted next to the rear wheel hub, where a pair of crown gear faces are mounted in power transfer relation to the pinion gear. The crown gear faces may be either a pair of spaced apart gears on opposite sides of the rear hub or a single double sided gear integral with, or surrounding, the rear hub. The opposite end of the power assembly extends toward the front wheel at an angle for convenient pedal motion parallel to the assembly. Each pedal carries a slider which moves along the track of the power assembly and includes a slot which captures the cross-section of the helical bar. Motion of the pedals forces rotation of the helical bar. A freewheel mechanism at the end of the bar, coaxial with the pinion gear, allows power transfer from the pinion to the crown gear only during rearward pedal motion, corresponding to rotation of the helical bar in one direction and freewheeling during the pedal reset motion.

An arc-like position of the bicycle rider can produce a lower center of gravity compared to conventional bicycles, giving a better balance. Forward and downward curved handlebars, possibly made of a composite material, lower the frontal area and silhouette, and create a lower drag coefficient, as well as provide some shock absorption. In this manner, maximum power transfer from the human body to the driving wheel via the helical drive train is achieved. The increased efficiency of the bicycle of the present invention is realized particularly in sprint racing, where simplicity of design is a particular advantage. Since direct drive is used, the frame consists of a single hollow frame tube, a front fork tube for the front wheel and rear forks extending from the frame tube for the rear wheel. This drastically reduces weight compared to the safety bicycle, which typically features a triangular frame, plus front and rear fork tubes. An appropriate gear is selected by choice of front to rear wheel sizes, as well as gear ratios of the crown and pinion gears. In this application, bicycles are intended to include exercise cycles.

BEST MODE FOR CARRYING OUT THE INVENTION

Figure 1:
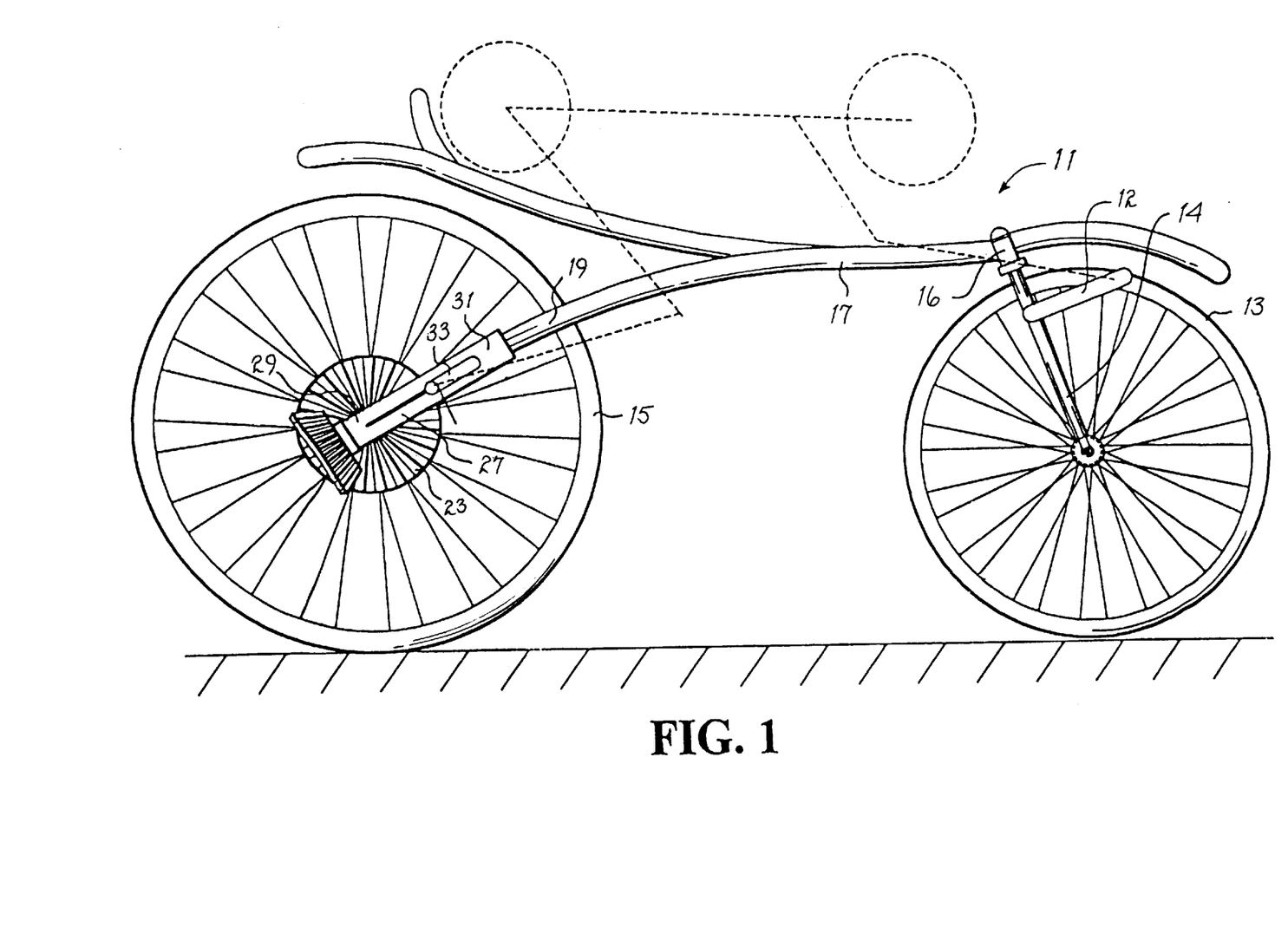
FIG. 1 is a schematic plan side view of a bicycle in accord with the present invention.
Figure 2:
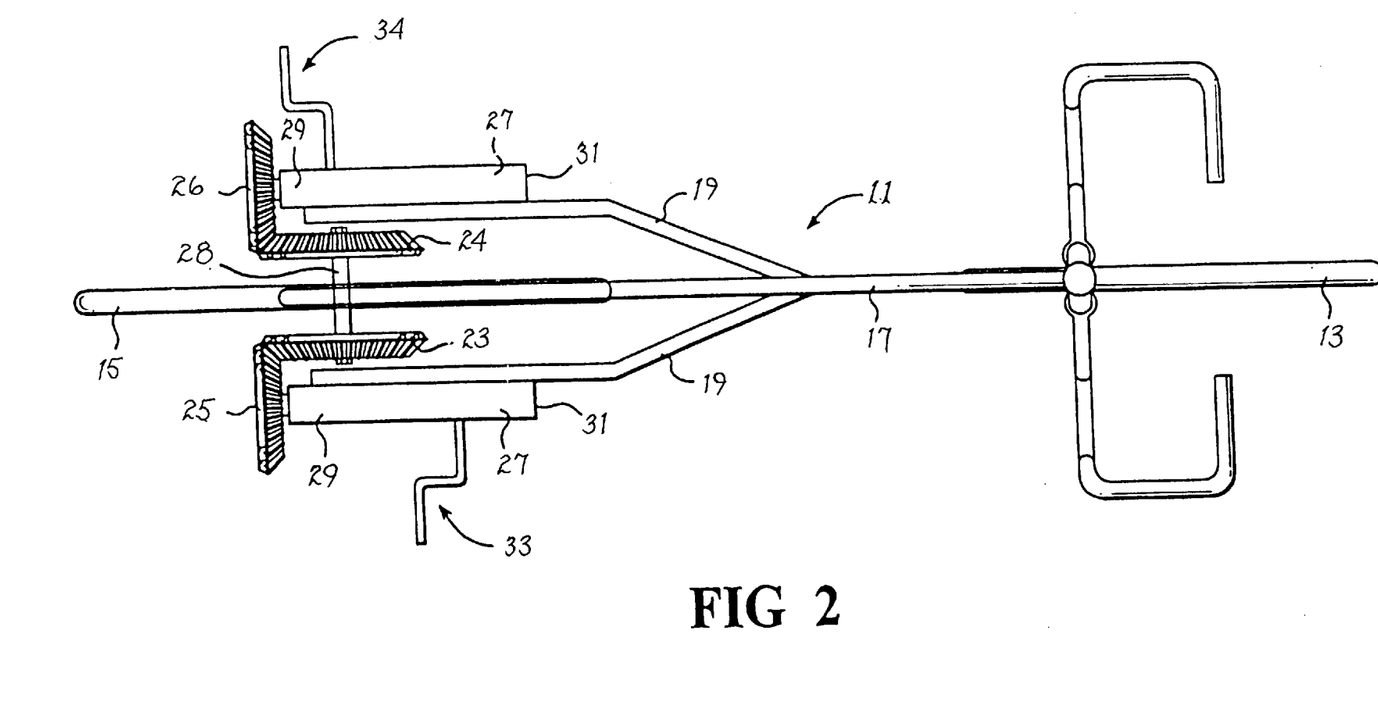
FIG. 2 is a top plan view of the bicycle of FIG. 1.

With reference to FIGS. 1 and 2, a bicycle 11 is shown having a front wheel 13 and a rear wheel 15. A frame extends between the wheels with a frame bar 17 having rear forks 19 supporting a hub 28 of the rear wheel 15. The rear hub carries a pair of crown gears 23 on opposite sides of the hub facing the forks. A power assembly 27 has a first end 29 mounted near the rear hub and a free end 31 extending toward the front wheel, with each power assembly having a pedal 33 moving with linear motion along the length of the assembly. The power assembly 27 includes a mechanism, described below, for converting the linear reciprocal pedal motion to rotational motion of the crown gear 23, without a chain or belt, i.e. by direct drive. In FIG. 1, handle bar members 12 may be anchored to fork 14 below the tube 16 which contains steering bearings. This provides a rider with a lower center of gravity than found in the usual handle bar position.

Figure 3:
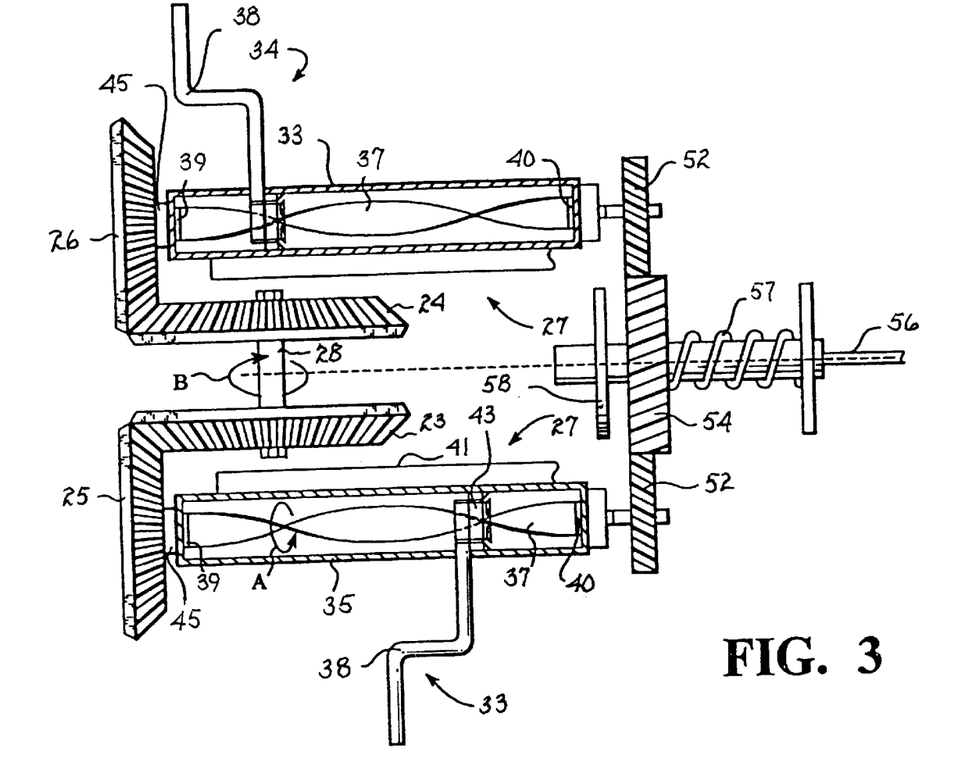
FIG. 3 is a top plan view of an alternate embodiment of a drive mechanism used in the bicycle of FIG. 1.

In FIG. 3, the rear wheel hub 28 is seen to support a pair of crown gears 23 and 24 on opposite sides of the rear wheel, not shown. Each of the power assemblies 27 include an elongated bar 37 having a helical twist about a central axis. Each bar is supported by bearings 39 and 40 for rotation about the axis in the direction indicated by arrow A. A linear track 41, parallel to the axis of the bar, guides an edge of a slider 43 so that the slider travels parallel to track 41 without twisting. Although not shown, a second track could be opposite and parallel to the first track, within or outside of a cylindrical housing for the power assembly. Slider 43 has a rectangular slot for allowing the cross-section of bar 37 to pass therethrough, with bearings of the slider contacting the bar. The slot in the slider forces rotation of the bar as the pedals push the slider linearly toward pinion gear 25. Bar 37 and support bearings 39 and 40 may reside in the cylindrical housing 35 to keep dirt out of the slider and provide for smoother slider motion over the bar, but the housing is optional. Housing 35 has a lengthwise slot to permit pedal 33 to protrude therethrough. Similarly, housing 36 has a slot to permit pedal 34 to protrude therethrough and reciprocate linearly over the length of bar 37. A freewheel 45 or overrunning clutch connects pinion gear 25 to bar 37 and bearings 39 and 40. The freewheel member has the function of transferring torque from bar 37 to pinion gear 25 when the helical bar moves in one direction upon rearward pedal motion. However, during forward pedal motion, the freewheel member 45 idles, without power transfer. This is explained further below with reference to FIG. 8.

In one embodiment, as in FIG. 3, each bar 37 should be a steel or titanium member having a thickness of about ¼ inch and a width of slightly less than 1 inch. The number of twists depends upon the desired ultimate velocity and the load being propelled. The length of each bar is between 12 and 18 inches, with a maximum of about 36 inches. It should be noted that when a pedal is pushed fully rearwardly, the pedal extends behind the rear hub because of a rearward offset 38 which allows the pedal to extend rearward of the rear hub 28, for maximum leg extension. Once the pedal 34 reaches its maximum rearward travel, a rider begins pushing the opposite pedal 35 so that pedal 33 may be disengaged from power transfer by the freewheel, depending on whether optional synchronizing gears 52 and timing gear 54 are used. If used to set the desired synchronism of the pedals, a pair of synchronizing gears 52 mesh with timing gear 54. A cable 56 will pull a flange 58, compressing spring 57 allowing the pedals to be positioned wherever desired by allowing freewheel turning of bars 37. Once set in a desired position, opposing pedals can be locked in place by allowing timing gear 54 to mesh with synchronizing gears 52. Note that crown wheels 23 and 24 rotate in the same direction, indicated by arrow B. This means that pinions 25 and 26 rotate oppositely. This can only occur when one pedal travels rearwardly and essentially drives both pinion gears, although the second pinion gear is idling where the optional synchronizing gears are not used. The rearwardmost pedal must be reset to a forward position, and this is done by allowing the corresponding helical bar to idle by means of a freewheel while the pedal is reset by a rider pulling the pedal back with a shoe cleat or the like fastened to the pedal.

Figure 4:
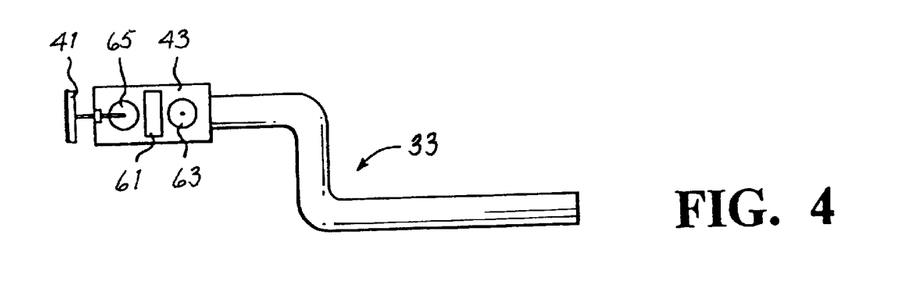
FIG. 4 is a front plan view of a pedal and slider mechanism.
Figure 5:
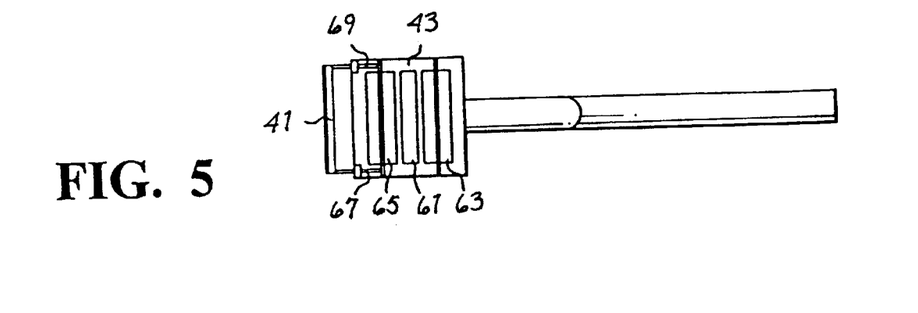
FIG. 5 is a top plan view of the slider mechanism of FIG. 4.

In FIGS. 4 and 5, the slider 43 has a central cutout region 61 which accommodates the helical bar. On either side of the helical bar are rollers, including a fixed roller 63 and an adjustable roller 65. The adjustable roller is biased by springs 67 and 69 to press the roller against the bar 61 for tight rolling contact. By providing springs, any dirt or debris which lands on the surface of the bar will still allow propulsion without jamming. Pedal 33 is a unitary metal or polymer member of strength such that the pedal does not bend significantly during maximum power strokes. The inward end of the pedal may be threaded for screwing into the slider, which is a metal block which may be made of sections to accommodate the bar opening 61 and the fixed and adjustable rollers 63 and 65.

Figure 6:
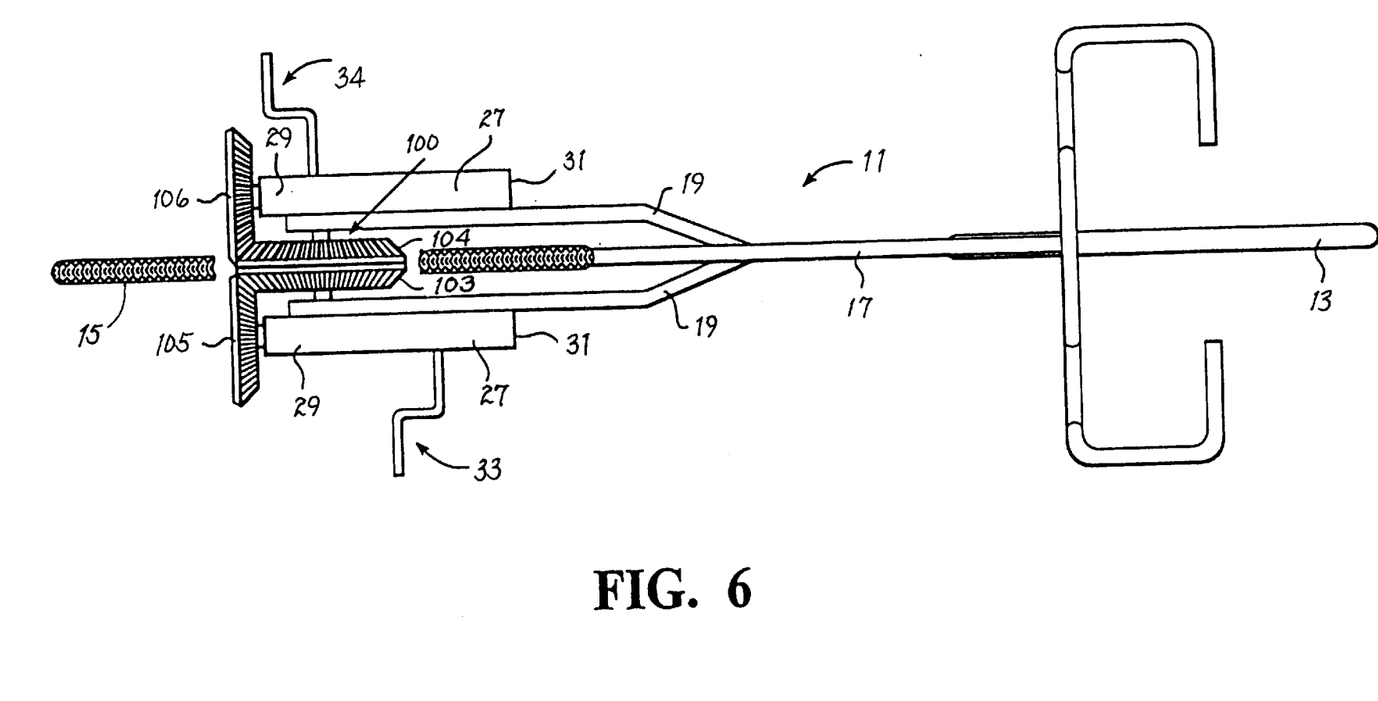
FIG. 6 is an alternate embodiment of the bicycle shown in FIG. 1.

FIG. 6 resembles FIG. 2, except that the spaced apart crown gears 23 and 24 of FIG. 2 have been joined together to form a single double-sided gear 100 having opposed gear faces 103 and 104. The opposed gear faces mesh with pinions 105 and 106 at the end of a respective power assembly 27. By collapsing the two crown gears together, the two gear faces may reside in a plane which is coplanar with the wheel itself. The single two-faced gear has a central aperture for a hub to pass there through. However, unlike conventional hubs, the hub does not contain spoke flanges. The spoke flanges may be at the outer periphery of the gear, as shown in FIG. 7.

Figure 7:
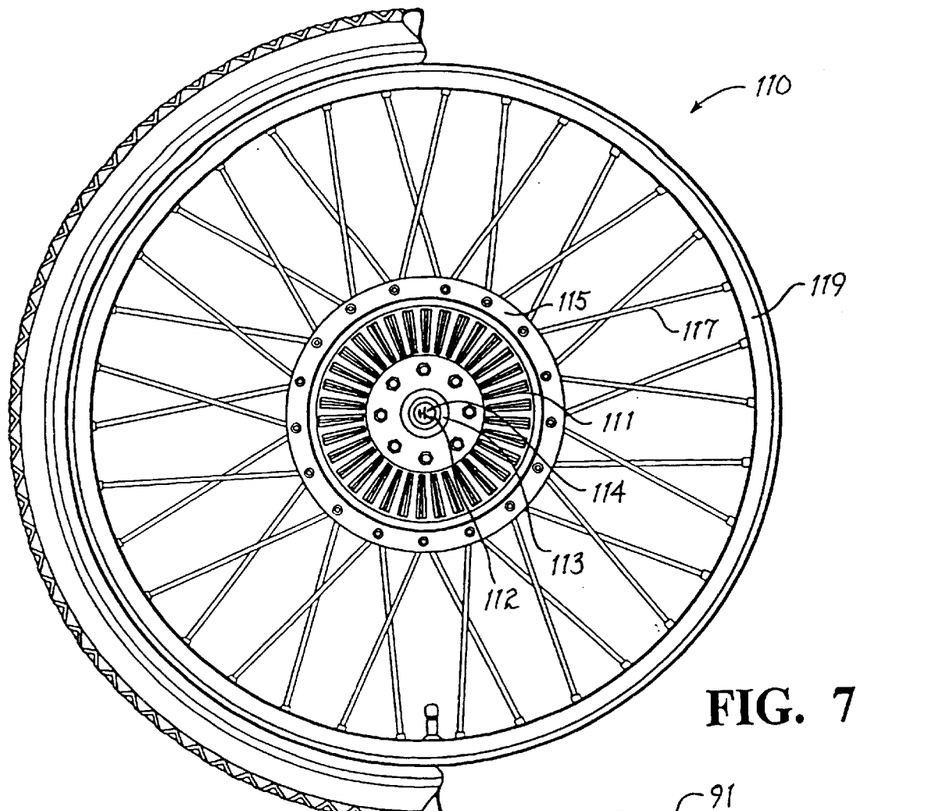
FIG. 7 is a side plan view of a bicycle wheel used in the embodiment shown in FIG. 6.

In FIG. 7, wheel 110 includes a gear face 111 having a central aperture 113 for a wheel hub 114 to be connected thereto. At the radial outer periphery 115 of the gear face, holes exist for anchoring spokes 117, providing support for rim 119. The appearance of the opposite side of the wheel is substantially identical. Rim 119 is supported by spokes anchored at the outward radial periphery of opposing gear faces.

Figure 8:
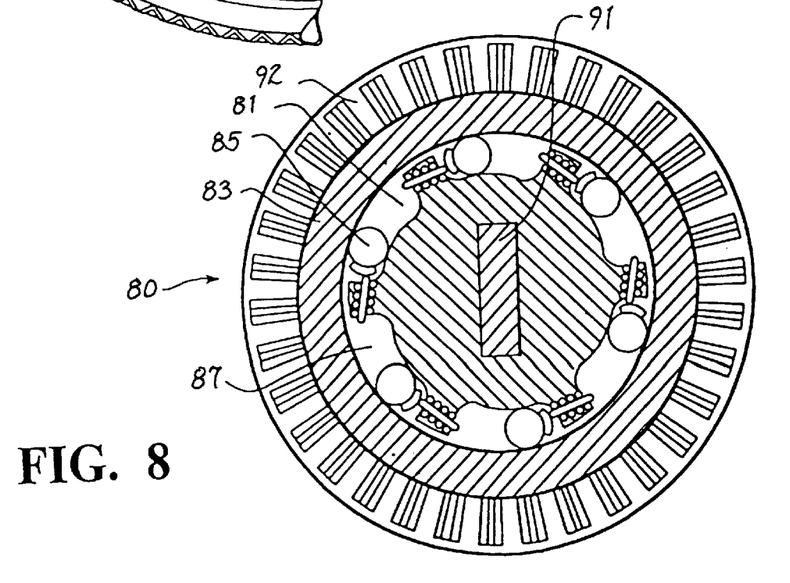
FIG. 8 is a sectional view of a clutch used to couple power from the drive shaft to drive gears.

In FIG. 8, the rear end of bar 91 is fit as a spline within a rotary vane member 81 of overrunning clutch 80. The rotary vane is locked to the bar so that when the bar turns, the rotary vane also turns. Rotary vane 81 is fit within a tubular sleeve 83 which is connected to pinion gear 92. Rotary vane 81 has sloped shoulders 87 which serve to wedge cylindrical rollers 85 when the vane turns in the direction of arrow A, but allows free rolling of the rollers when the vane turns in the direction indicated by arrow B. Such overrunning clutches or free wheels are well known in conventional hub construction. The rear cycle hub may be equipped with conventional internal gears. A small chain 112 extending into a metal sleeve coaxial with the hub is used to shift gears inside of the hub.

Figure 9:
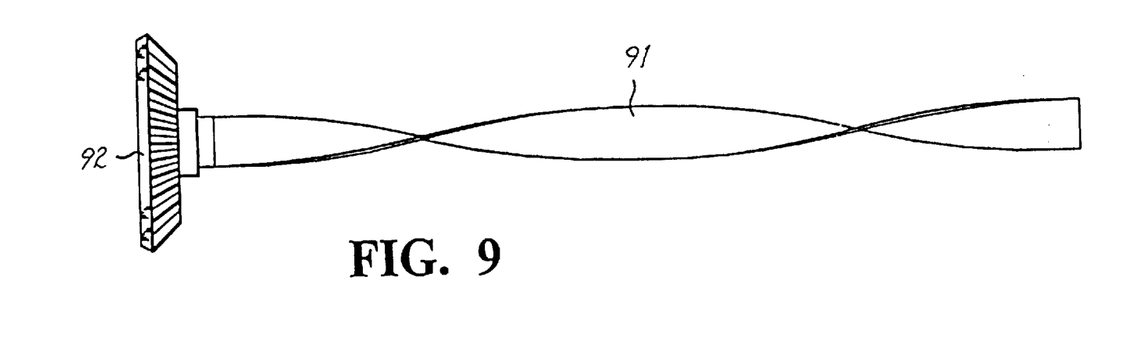
FIGS. 9–13 are alternate drive shaft constructions.

FIGS. 9–12 show helical drive bars with varying amounts of twist in each bar within a power assembly. In FIG. 9, the helical bar 91 has two full twists uniformly extending over the length of the shaft from the free end to the pinion gear 92. In the helical bar of FIG. 10, the bar 93 has a first portion 95, toward the free end of the helical bar which is identical to the bar of FIG. 9. However, toward the end 97 of the bar nearest the pinion gear 92, the bar twists more rapidly so that at the pinion gear, two-and-a-half twists have been made by increasing the rate of twist at end 97.

Even further twisting can be accomplished, as seen in FIG. 11, where once again the free end of the bar 96 has the same twist ratio as in FIGS. 8 and 9, but the end of the bar, 99, closest the pinion gear 92, twists at a greater rate, achieving three full twists over the length of the bar. The rate of twist is varied to accommodate application of power to the power assembly. At the first portion of a power stroke, twisting is gradual to facilitate the initial application of energy to the bar. As the stroke progresses, rotational velocity of the bar would tend to increase if resistance were not provided. Additional resistance comes from increased twists, which allows greater amounts of power to be transferred to the pinion gear, while maintaining the slider at approximately a uniform velocity through the length of a stroke. Uniform velocity of the pedal allows maximum power transfer to the cycle and prevents leg muscles from becoming overly tired due to variations of effort.

Figure 11:
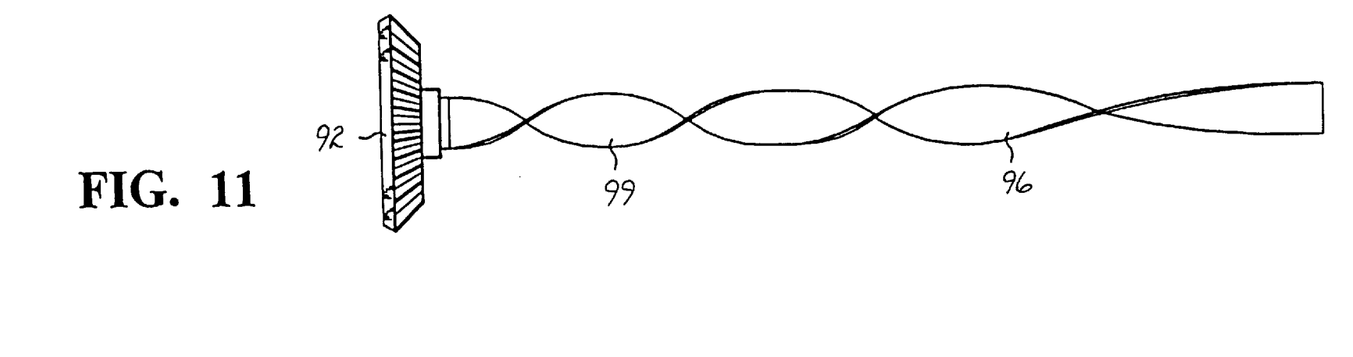
Figure 12:
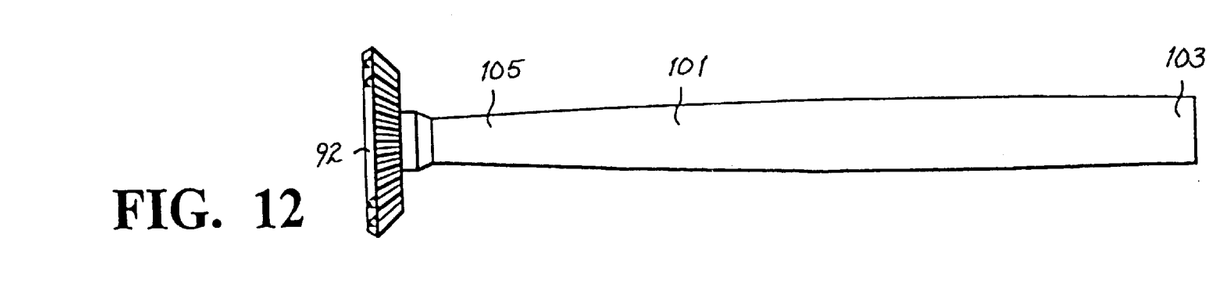

A similar effect to varying the twist ratio may be achieved by tapering the bar. FIG. 12 shows a gradual taper along the length of bar 101. At the free end of the bar 103, where a stroke begins, full leverage across the width of the bar facilitates turning of the bar. As the slider progresses toward the center of the bar, less of the slider is in contact with the bar, and because the bar has narrower width, less of a mechanical advantage is obtained in turning the bar. Finally, at the end 105, the slider provides the minimal mechanical advantage to rotation of the bar, since the effective lever arm for twisting is shortest, thereby requiring greater effort from a rider. Thus, there is less resistance to turning the bar at the free end 103 and greater resistance at end 105, closest the pinion gear. This tapering effect tends to provide for uniform velocity of the slider across the length of the bar as power is initiated from the free end of the bar toward the pinion gear, as in the variable twist ratio designs shown in FIGS. 10 and 11.

Figure 10:
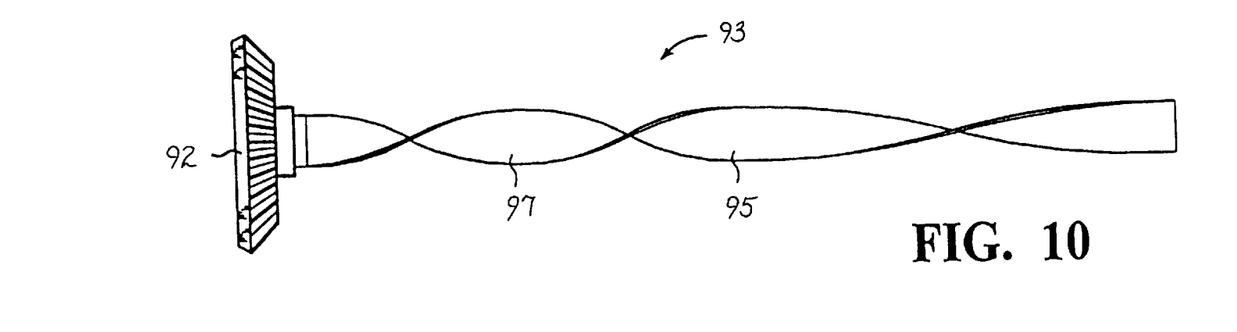
Figures 13, 14:
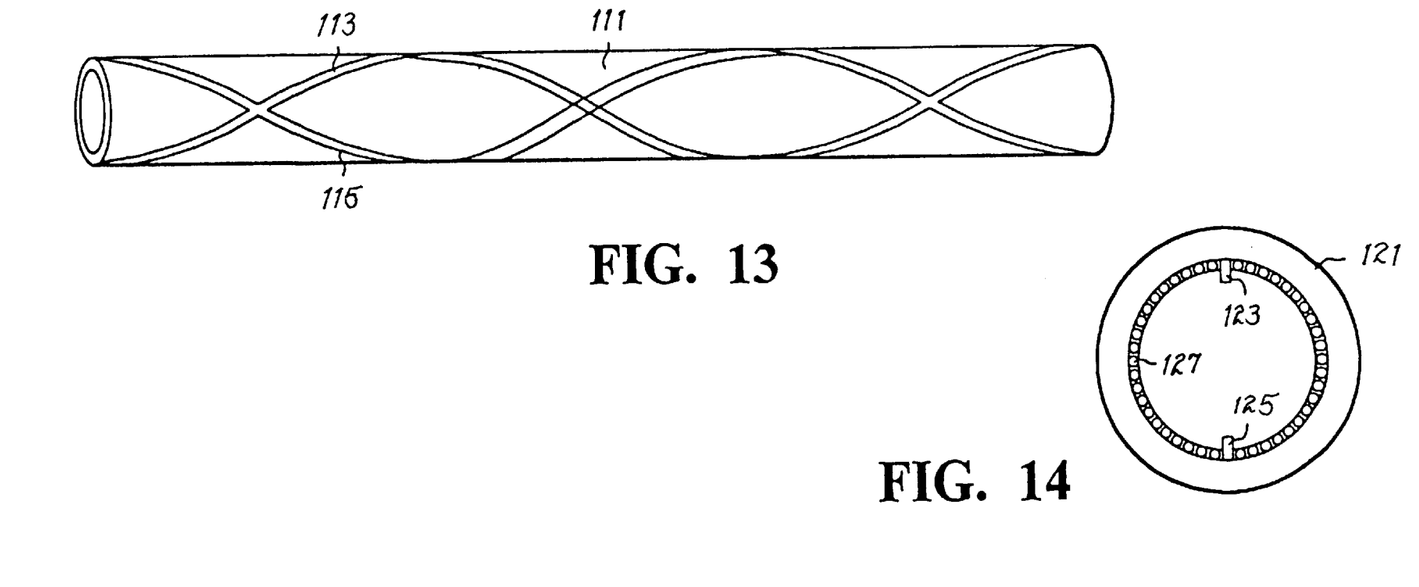
FIG. 14 is a cross-sectional view of a slider for the drive shaft of FIG. 13.

FIG. 13 shows a cylindrical member ill in place of a bar. The cylindrical member has symmetric double helical grooves 113 and 115 over the length of the cylinder. FIG. 14 shows an annular slider 121 having splines 123 and 125 which follow helical grooves 113 and 115. Bearings 127 about the inner periphery of the slider provide for smooth contact with the cylinder 111. Slider 121 carries a pedal, not shown, and is a component of one of two power assemblies for each bicycle in the manner shown in FIG. 2. The helical grooves may be uniform over a length of a cylinder or may be varied in a manner of the helical bars, as shown in FIGS. 10 and 11.

In operation, the new bicycle drive system of the present invention produces a more efficient bicycle configuration. The drive system of the present invention is more closely linked to direct drive designs of the original bicycle than to the indirect drive mechanisms of modern bicycles. Additionally, the design of the bicycle of the present invention allows for a low center of gravity, small rider and cycle cross-sections in the direction of travel and an efficient power transfer mechanism. Although a bicycle with a face forward rider has been described, the drive mechanism of the present invention is also applicable to recumbent cycles where the rider is mounted with the head toward the rear of the cycle.

What is claimed is:
1. A bicycle comprising:
a. a front wheel,
b. a rear wheel, where the rear wheel includes a dual input hub, comprising:
   a bicycle wheel hub,
   a first crown gear coaxially rotatably mounted to one end of the hub,
   a second crown gear coaxially rotatably mounted to the other end of the hub,
   internal gears, and
   a chain extending into a metal sleeve coaxial with the hub, adapted to shift the gears inside the hub,
c. a seat,
d. a steering mechanism,
e. a braking mechanism,
f. a frame attached to the wheels, the seat, and the steering mechanism, where the frame comprises:
   a front fork attachment mechanism,
   a seat attachment mechanism,
   a rectilinear power assembly attachment mechanism,
   a rear wheel attachment mechanism,
   a structural member attached to the front fork attachment mechanism, the seat attachment mechanism, the rectilinear power assembly attachment mechanism, and the rear wheel attachment mechanism,
   the structural member has a rear fork connected to the rear wheel attachment mechanism, and
   the power assembly attachment mechanism is located on each side of the rear fork mostly below and behind the seat, requiring an arc-like posture, and is adapted to orient the rectilinear power assembly on each side of the rear fork to be in contact with both sides of and turn a rear wheel attached to the frame by the rear wheel attachment mechanism,
g. a rectilinear power assembly attached to the rear end of the frame, and connected to the rear wheel, and adapted to rotate the rear wheel, with a first helical member attached to a first side of the frame, and a second helical member attached to a second side of the frame, where the power assembly further comprises:
   the first helical member has a first end and second end,
   a first slider, slidably attached to the first helical member,
   a first free-wheel mechanism, attached to the first end of the helical member,
   a first pinion gear, attached to the first free-wheel mechanism,
   such that, when the first slider slides along the first helical member towards the first end, the first helical member rotates in a first direction, and engages the first free-wheel mechanism, and rotates the first pinion gear in the first direction,
   such that, when the first slider slides along the first helical member towards the second end, the first helical member rotates in a second direction, and the first free-wheel mechanism free wheels, and does not rotate the first pinion gear in the second direction,
   the second helical member has a first end and a second end,
   a second slider, slidably attached to the second helical member,
   a second free-wheel mechanism, attached to the first end of the second helical member,
   a second pinion gear, attached to the second free-wheel mechanism,
   such that, when the second slider slides along the second helical member towards the first end, the second helical member rotates in the direction and engages the second free-wheel mechanism, and rotates the second pinion gear in the second direction,
   such that, when the second slider slides along the second helical member towards the second end, the second helical member rotates in the first direction, and the second free-wheel mechanism free wheels, and does not rotate the second pinion gear in the first direction,
   a first synchronization gear, coaxially attached to the second end of the first helical member,
   a second synchronization gear, coaxially attached to the second end of the second helical member, a timing gear, meshable with the synchronization gears,
such that, when the timing gear is not meshed with the synchronization gears, then the sliders move independently,
when the timing gear is meshed with the synchronization gears, the sliders move reciprocally in opposite directions from each other,
a first pedal is attached to the first slider, and is movable parallel to the first helical member,
a first housing enclosing the first helical member and the first slider, with an axial slot in the first housing permitting the first pedal to remain outside the first housing, and preventing the first slider from rotating as the first slider slides along the first helical member,
a second pedal is attached to the second slider, and is movable parallel to the second helical member,
a second housing enclosing the second helical member and the second slider, with an axial slot in the second housing permitting the second pedal to remain outside the second housing, and preventing the second slider from rotating as the second slider slides along the second helical member,
the first and second helical members are each a twisted bar, with a rectangular cross-section, and
the first and second sliders each have a rectangular hole centered in the slider through which the first and second helical members respectively pass, and
h. the first pinion gear of the power assembly meshes with and rotates the first crown gear of the hub, and the second pinion gear of the power assembly meshes with and rotates the second crown gear of the hub.

2. A bicycle comprising:
a. a front wheel,
b. a rear wheel,
c. a seat,
d. a steering mechanism
e. a braking mechanism,
f. a frame attached to the wheels the seat, and the steering mechanism, and
g. a power assembly attached to the rear end of the frame, mostly below and behind the seat, connected to the rear wheel, and adapted to rotate the rear wheel,
where the power assembly is rectilinear and comprises:
a. a first helical member, with a first end and a second end,
b. a first slider, slidably attached to the first helical member,
c. a first free-wheel mechanism, attached to the first end of the first helical member,
d. a first pinion gear, attached to the first free-wheel mechanism,
e. such that, when the first slider slides along the first helical member towards the first end, the first helical member rotates in a first direction, and engages the first free-wheel mechanism, and rotates the first pinion gear in the first direction,
f. such that, when the first slider slides along the first helical member towards the second end, the first helical member rotates in a second direction, and the first free-wheel mechanism free wheels, and does not rotate the first pinion gear in the second direction,
g. a second helical member, with a first end and a second end,
h. a second slider, slidably attached to the second helical member,
i. a second free-wheel mechanism, attached to the first end of the second helical member,
j. a second pinion gear, attached to the second free-wheel mechanism,
k. such that, when the second slider slides along the second helical member towards the first end, the second helical member rotates in the second direction and engages the second free-wheel mechanism, and rotates the second pinion gear in the second direction,
l. such that, when the second slider slides along the second helical member towards the second end, the second helical member rotates in the first direction, and the second free-wheel mechanism free wheels, and does not rotate the second pinion gear in the first direction,
m. a first synchronization gear, coaxially attached to the second end of the first helical member,
n. a second synchronization gear, coaxially attached to the second end of the second helical member,
o. a timing gear, meshable with the synchronization gear,
p. such that, when the timing gear is not meshed with the synchronization gears, then the sliders move independently,
q. when the timing gear is meshed with the synchronization gears, the sliders move reciprocally in opposite directions from each other,
r. the first pedal is attached to the first slider, and moves parallel with the first helical member,
s. a first housing enclosing the first helical member and the first slider, with an axial slot in the first housing permitting the first pedal to remain outside the first housing, and preventing the first slider from rotating as the first slider slides along the first helical member,
t. the second pedal is attached to the second slider, and moves parallel with the second helical member,
u. a second housing enclosing the second helical member and the second slider, with an axial slot in the second housing permitting the second pedal to remain outside the second housing, and preventing the second slider from rotating as the second slider slides along the second helical member,
v. the first and second helical members are each a twisted bar, with a rectangular cross-section, and
w. the first and second sliders each have a rectangular hole centered in the slider through which the first and second helical members respectively pass.

3. A bicycle frame comprising:
a. front fork attachment mechanism,
b. seat attachment mechanism,
c. power assembly attachment mechanism,
d. rear wheel attachment mechanism, and
e. a structural member attached to the front fork attachment mechanism, the seat attachment mechanism the power assembly attachment mechanism, and the rear wheel attachment mechanism, such that the rear wheel attachment mechanism is next to the power assembly attachment mechanism, and the power assembly attachment mechanism is mostly below and behind the seat,
where:
f. the power assembly attachment mechanism is a rectilinear power assembly attachment mechanism, and
g. the power assembly attachment mechanism extends at an angle from the rear wheel attachment mechanism generally towards the front fork attachment mechanism at an angle for convenient pedal motion parallel to the power assembly attachment mechanism.

4. A bicycle comprising:
a. a front wheel,
b. a rear wheel, where the rear wheel includes a dual input hub, comprising:
   a bicycle wheel hub,
   a first crown gear coaxially rotatably mounted to one end of the hub,
   a second crown gear coaxially rotatably mounted to the other end of the hub,
   internal gears, and
   a chain extending into a metal sleeve coaxial with the hub, adapted to shift the gears inside the hub,
c. a seat,
d. a steering mechanism,
e. a frame attached to the wheels, the seat, and the steering mechanism, where the frame comprises:
   a front fork attachment mechanism,
   a seat attachment mechanism,
   a rectilinear power assembly attachment mechanism,
   a rear wheel attachment mechanism,
   a structural member attached to the front fork attachment mechanism, the seat attachment mechanism, the rectilinear power assembly attachment mechanism, and the rear wheel attachment mechanism,
   the structural member has a rear fork connected to the rear wheel attachment mechanism, and
   the power assembly attachment mechanism is located on each side of the rear fork mostly below and behind the seat, requiring an arc-like posture, and is adapted to orient the rectilinear power assembly on each side of the rear fork to be in contact with both sides of an turn a rear wheel attached to the frame by the rear wheel attachment mechanism,
f. a rectilinear power assembly attached to the rear end of the frame, and connected to the rear wheel, and adapted to rotate the rear wheel, with a first helical member attached to a first side of the frame, and a second helical member attached to a second side of the frame, where the power assembly further comprises:
   the first helical member has a first end and a second end,
   a first slider, slidably attached to the first helical member,
   a first free-wheel mechanism, attached to the first end of the first helical member,
   a first pinion gear, attached to the first free-wheel mechanism,
   such that, when the first slider slides along the first helical member towards the first end, the first helical member rotates in a first direction, and engages the first free-wheel mechanism, and rotates the first pinion gear in the first direction,
   such that, when the first slider slides along the first helical member towards the second end, the first helical member rotates in a second direction, and the first free-wheel mechanism free wheels, and does not rotate the first pinion gear in the second direction,
   the second helical member has a first end and a second end,
   a second slider, slidably attached to the second helical member,
   a second free-wheel mechanism, attached to the first end of the second helical member,
   a second pinion gear, attached to the second free-wheel mechanism,
   such that, when the second slider slides along the second helical member towards the first end, the second helical member rotates in the second direction and engages the second free-wheel mechanism, and rotates the second pinion gear in the second direction,
   such that, when the second slider slides along the second helical member towards the second end, the second helical member rotates in the first direction, and the second free-wheel mechanism free wheels, and does not rotate the second pinion gear in the first direction,
   a first synchronization gear, coaxially attached to the second end of the first helical member,
   a second synchronization gear, coaxially attached to the second end of the second helical member,
   a timing gear, meshable with the synchronization gears,
   such that, when the timing gear is not meshed with the synchronization gears, then the sliders move independently,
   when the timing gear is meshed with the synchronization gears, the sliders move reciprocally in opposite directions from each other,
   a first pedal is attached to the first slider, and is movable parallel to the first helical member,
   a first housing enclosing the first helical member and the first slider, with an axial slot in the first housing permitting the first pedal to remain outside the first housing, and preventing the first slider from rotating as the first slider slides along the first helical member,
   a second pedal is attached to the second slider, and is movable parallel to the second helical member,
   a second housing enclosing the second helical member and the second slider, with an axial slot in the second housing permitting the second pedal to remain outside the second housing, and preventing the second slider from rotating as the second slider slides along the second helical member,
   the first and second helical members are each a twisted bar, with a rectangular cross-section, and
   the first and second sliders each have a rectangular hole centered in the slider through which the first and second helical members respectively pass, and
g. the first pinion gear of the power assembly meshes with and rotates the first crown gear of the hub, and the second pinion gear of the power assembly meshes with and rotates the second crown gear of the hub.

5. A bicycle comprising:
a. a front wheel,
b. a rear wheel,
c. a seat,
d. a steering mechanism,
e. a frame attached to the wheels, the seat, and the steering mechanism, and
f. a power assembly attached to a rear end of the frame, mostly below and behind the seat, connected to the rear wheel, and adapted to rotate the rear wheel, where the power assembly is rectilinear and comprises:
a. a first helical member, with a first end and a second end,
b. a first slider, slidably attached to the first helical member,
c. a first free-wheel mechanism, attached to the first end of the first helical member, d. a first pinion gear, attached to the first free-wheel mechanism, e. such that, when the first slider slides along the first helical member towards the first end, the first helical member rotates in a first direction, and engages the first free-wheel mechanism, and rotates the first pinion gear in the first direction, f. such that, when the first slider slides along the first helical member towards the second end, the first helical member rotates in a second direction, and the first free-wheel mechanism free wheels, and does not rotate the first pinion gear in the second direction, g. a second helical member, with a first end and a second end, h. a second slider, slidably attached to the second helical member, i. a second free-wheel mechanism, attached to the first end of the second helical member, j. a second pinion gear, attached to the second free-wheel mechanism, k. such that, when the second slider slides along the second helical member towards the first end, the second helical member rotates in the second direction and engages the second free-wheel mechanism, and rotates the second pinion gear in the second direction, l. such that, when the second slider slides along the second helical member towards the second end, the second helical member rotates in the first direction, and the second free-wheel mechanism free wheels, and does not rotate the second pinion gear in the first direction, m. a first synchronization gear, coaxially attached to the second end of the first helical member, n. a second synchronization gear, coaxially attached to the second end of the second helical member, o. a timing gear, meshable with the synchronization gear, p. such that, when the timing gear is not meshed with the synchronization gears, then the sliders move independently, q. when the timing gear is meshed with the synchronization gears, the sliders move reciprocally in opposite directions from each other, r. the first pedal is attached to the first slider, and moves parallel with the first helical member, s. a first housing enclosing the first helical member and the first slider, with an axial slot in the first housing permitting the first pedal to remain outside the first housing, and preventing the first slider from rotating as the first slider slides along the first helical member, t. the second pedal is attached to the second slider, and moves parallel with the second helical member, u. a second housing enclosing the second helical member and the second slider, with an axial slot in the second housing permitting the second pedal to remain outside the second housing, and preventing the second slider from rotating as the second slider slides along the second helical member, v. the first and second helical members are each a twisted bar, with a rectangular cross-section, and w. the first and second sliders each have a rectangular hole centered in the slider through which the first and second helical members respectively pass.

6. A bicycle comprising:

a. a front wheel, b. a rear wheel, c. a seat, d. a steering mechanism, e. a frame attached to the wheels, the seat, and the steering mechanism, and a power assembly including first and second pedals attached to a rear end of the frame, mostly below and behind the seat and connected to the rear wheel, f. wherein said first and second pedals are adapted to move in an area mostly behind and below said seat to rotate the rear wheel, g. wherein the power assembly is rectilinear and comprises:

a first helical member, with a first end and a second end, a first slider, slidably attached to the first helical member, a first free-wheel mechanism, attached to the first end of the first helical member, a first pinion gear, attached to the first free-wheel mechanism, such that, when the first slider slides along the first helical member towards the first end, the first helical member rotates in a first direction, and engages the first free-wheel mechanism, and rotates the first pinion gear in the first direction, and such that, when the first slider slides along the first helical member towards the second end, the first helical member rotates in a second direction, and the first free-wheel mechanism free wheels, and does not rotate the first pinion gear in the second direction.

7. The bicycle in claim 6, the power assembly of said bicycle further comprising:

a. a second helical member, with a first end and a second end, b. a second slider, slidably attached to the second helical member, c. a second free-wheel mechanism, attached to the first end of the second helical member, d. a second pinion gear, attached to the second free-wheel mechanism, e. such that, when the second slider slides along the second helical member towards the first end, the second helical member rotates in the second direction and engages the second free-wheel mechanism, and rotates the second pinion gear in the second direction, and f. such that, when the second slider slides along the second helical member towards the second end, the second helical member rotates in the first direction, and the second free-wheel mechanism free wheels, and does not rotate the second pinion gear in the first direction.

8. The bicycle in claim 6, said power assembly of said bicycle further comprising:

a. a first synchronization gear, coaxially attached to the second end of the first helical member, b. a second synchronization gear, coaxially attached to the second end of the second helical member, c. a timing gear, meshable with the synchronization gear, d. such that, when the timing gear is not meshed with the synchronization gears, then the sliders move independently, and e. when the timing gear is meshed with the synchronization gears, the sliders move reciprocally, in opposite directions from each other.

9. The bicycle in claim 6, said power assembly of said bicycle further comprising:
   a. a first pedal attached to the first slider, the first pedal movable parallel with the first helical member, and
   b. a first housing enclosing the first helical member and the first slider, with an axial slot in the first housing permitting the first pedal to remain outside the first housing, and preventing the first slider from rotating as the first slider slides along the first helical member.

10. The bicycle in claim 7, said power assembly of said bicycle further comprising:
    a. a second pedal attached to the second slider, the second slider movable parallel with the second helical member, and
    b. a second housing enclosing the second helical member and the second slider, with an axial slot in the second housing permitting the second pedal to remain outside the second housing, and preventing the second slider from rotating as the second slider slides along the second helical member.

11. The bicycle in claim 6, where the power assembly of said bicycle further comprises:
    a. the first helical member is a twisted bar, with a rectangular cross-section, and
    b. the first slider has a rectangular hole centered in the first slider through which the first helical member passes.

12. The bicycle in claim 6, where the first helical member twists at a greater rate nearer the first end, and at a lesser rate nearer the second end.

13. The bicycle in claim 7, where:
    a. the second helical member is a twisted bar, with a rectangular cross-section, and
    b. the second slider has a rectangular hole centered in the second slider through which the second helical member passes.

14. The bicycle in claim 7, where the second helical member twists at a greater rate nearer the first end, and at a lesser rate nearer the second end.

15. The bicycle in claim 7, where the first and second helical members each twist at a uniform rate.

16. The bicycle in claim 7, where the first and second helical members are cylinders with grooves on the outer surface.

17. The bicycle in claim 7, where the first and second helical members are each twisted bars and the sliders each have two roller bearings, one on either side of the slider's helical member, one roller fixed to the slider and the other roller adjustable to the slider, the adjustable roller bearing biased by springs to press in tight rolling contact to the helical member.

18. A bicycle comprising:
    a. a front wheel,
    b. a rear wheel,
    c. a seat,
    d. a steering mechanism,
    e. a frame attached to the wheels, the seat, and the steering mechanism, and
    f. a rectilinear power assembly including first and second pedals attached to a rear end of the frame, and connected to the rear wheel, and adapted to rotate the rear wheel, with a first helical member having a first longitudinal axis attached to a first side of the frame, and a second helical member having a second longitudinal axis attached to a second side of the frame,
    h. wherein said first and second pedals are movable in a direction parallel to said first and second longitudinal axes, respectively,
    i. said rectilinear power assembly of said bicycle comprising:
       a first helical member, with a first end and a second end,
       a first slider, slidably attached to the first helical member,
       a first free-wheel mechanism, attached to the first end of the first helical member,
       a first pinion gear, attached to the first free-wheel mechanism,
       such that, when the first slider slides along the first helical member towards the first end, the first helical member rotates in a first direction, and engages the first free-wheel mechanism, and rotates the first pinion gear in the first direction, and
       such that, when the first slider slides along the first helical member towards the second end, the first helical member rotates in a second direction, and the first free-wheel mechanism free wheels, and does not rotate the first pinion gear in the second direction.

19. The bicycle in claim 18, the power assembly of said bicycle further comprising:
    a. a second helical member, with a first end and a second end,
    b. a second slider, slidably attached to the second helical member,
    c. a second free-wheel mechanism, attached to the first end of the second helical member,
    d. a second pinion gear, attached to the second free-wheel mechanism,
    e. such that, when the second slider slides along the second helical member towards the first end, the second helical member rotates in the second direction and engages the second free-wheel mechanism, and rotates the second pinion gear in the second direction, and
    f. such that, when the second slider slides along the second helical member towards the second end, the second helical member rotates in the first direction, and the second free-wheel mechanism free wheels, and does not rotate the second pinion gear in the first direction.

20. The bicycle in claim 19, the power assembly of said bicycle further comprising:
    a. first synchronization gear, coaxially attached to the second end of the first helical member,
    b. a second synchronization gear coaxially attached to the second end of the second helical member,
    c. a timing gear, meshable with the synchronization gear,
    d. such that, when the timing gear is not meshed with the synchronization gears, then the sliders move independently, and
    e. when the timing gear is meshed with the synchronization gears, the sliders move reciprocally, in opposite directions from each other.

21. The bicycle in claim 18, the power assembly of said bicycle further comprising:
    a. a first pedal attached to the first slider, the first pedal movable parallel with the first helical member, and
    b. a first housing enclosing the first helical member and the first slider, with an axial slot in the first housing permitting the first pedal to remain outside the first housing, and preventing the first slider from rotating as the first slider slides along the first helical member.

22. The bicycle in claim 19, the power assembly of said bicycle further comprising:
    a. a second pedal attached to the second slider, the second slider movable parallel with the second helical member, and
    b. a second housing enclosing the second helical member and the second slider, with an axial slot in the second housing permitting the second pedal to remain outside the second housing, and preventing the second slider from rotating as the second slider slides along the second helical member.

23. The bicycle in claim 18, where:
a. the first helical member is a twisted bar, with a rectangular cross-section, and
b. the first slider has a rectangular hole centered in the first slider through which the first helical member passes.

24. The bicycle in claim 18, where the first helical member twists at a greater rate nearer the first end, and at a lesser rate nearer the second end.

25. The bicycle in claim 19, where:
a. the second helical member is a twisted bar, with a rectangular cross-section, and
b. the second slider has a rectangular hole centered in the second slider through which the second helical member passes.

26. The bicycle in claim 19, where the second helical member twists at a greater rate nearer the first end, and at a lesser rate nearer the second end.

27. The bicycle in claim 19, where the first and second helical members each twist at a uniform rate.

28. The bicycle in claim 19, where the first and second helical members are cylinders with grooves on the outer surface.

29. The bicycle in claim 19, where the first and second helical members are each twisted bars and the sliders each have two roller bearings, one on either side of the slider's helical member, one roller bearing fixed to the slider and the other roller bearing adjustable to the slider, the adjustable roller bearing biased by springs to press in tight rolling contact to the helical member.

* * * * *